United States Patent
Burkhart et al.

(10) Patent No.: US 8,719,098 B2
(45) Date of Patent: May 6, 2014

(54) REAL-TIME PRODUCT DELIVERY DURING CUSTOMER-DRIVEN POINT OF SALE RETAIL TRANSACTIONS

(75) Inventors: Michael John Burkhart, Round Rock, TX (US); James C. Colson, Austin, TX (US); Phuc Ky Do, Morrisville, NC (US); Justin Monroe Pierce, Cary, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 339 days.

(21) Appl. No.: 13/107,870

(22) Filed: May 13, 2011

(65) Prior Publication Data

US 2012/0290349 A1 Nov. 15, 2012

(51) Int. Cl.
*G06Q 30/00* (2012.01)
*G06Q 30/02* (2012.01)

(52) U.S. Cl.
CPC .................................. *G06Q 30/0268* (2013.01)
USPC .................... 705/14.65; 705/7.13; 705/14.38; 705/16; 705/20

(58) Field of Classification Search
CPC ...................... G06Q 10/06311; G06Q 30/0268
USPC .................... 705/7.13, 9, 20, 14.38, 14.65, 16
See application file for complete search history.

(56) References Cited

U.S. PATENT DOCUMENTS

| | | | |
|---|---|---|---|
| 6,694,300 B1 | 2/2004 | Walker et al. | 705/14.25 |
| 2002/0046124 A1* | 4/2002 | Alderucci et al. | 705/20 |
| 2002/0169686 A1 | 11/2002 | Zweben et al. | 705/14.1 |
| 2005/0055223 A1 | 3/2005 | Khosla | 705/9 |
| 2005/0171845 A1 | 8/2005 | Halfman et al. | 705/14 |
| 2007/0033098 A1 | 2/2007 | Peters et al. | 705/14.25 |
| 2007/0067200 A1* | 3/2007 | Patel | 705/9 |
| 2008/0266099 A1* | 10/2008 | Daily | 340/572.1 |
| 2009/0224037 A1 | 9/2009 | Walker et al. | 235/383 |
| 2011/0035247 A1* | 2/2011 | Perry et al. | 705/8 |
| 2011/0132691 A1* | 6/2011 | Menard | 186/52 |

FOREIGN PATENT DOCUMENTS

| | | | | |
|---|---|---|---|---|
| JP | 9107410 A | 4/1997 | | G01S 19/17 |
| WO | WO 02075496 A2 | 9/2002 | | G06Q 30/00 |

* cited by examiner

*Primary Examiner* — Ryan Zeender
*Assistant Examiner* — Hunter Wilder
(74) *Attorney, Agent, or Firm* — Patterson & Sheridan, LLP

(57) ABSTRACT

According to one embodiment of the present disclosure, an approach is provided in which a product request is received that corresponds to a point-of-sale (POS) device, which is located at a merchant facility. In addition to identifying a product location corresponding to the product, an employee location of an employee in proximity to the product location is also identified. In turn, an electronic message is sent to the employee's mobile device that includes a request to transport the product from the product location to the POS device.

17 Claims, 9 Drawing Sheets

REAL-TIME PRODUCT DELIVERY DURING CUSTOMER-DRIVEN POINT OF SALE RETAIL TRANSACTIONS

BACKGROUND

The present disclosure relates to real-time product delivery during customer-driven point of sale transactions. More specifically, the present disclosure relates to fulfilling product requests in real-time that are in response to a recent product purchase.

Traditional point of sale interactions deal with a customer collecting product at a merchant facility, and then taking the collected products to a merchant's point-of-sale (POS) device, which are scanned and purchased. These POS devices may be, for example, self-service checkout counters or employee attended checkout counters. Some products may correspond with other, additional products, such as batteries for a new toy.

BRIEF SUMMARY

According to one embodiment of the present disclosure, an approach is provided in which a product request is received that corresponds to a point-of-sale (POS) device, which is located at a merchant facility. In addition to identifying a product location corresponding to the product, an employee location of an employee in proximity to the product location is also identified. In turn, an electronic message is sent to the employee's mobile device that includes a request to transport the product from the product location to the POS device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
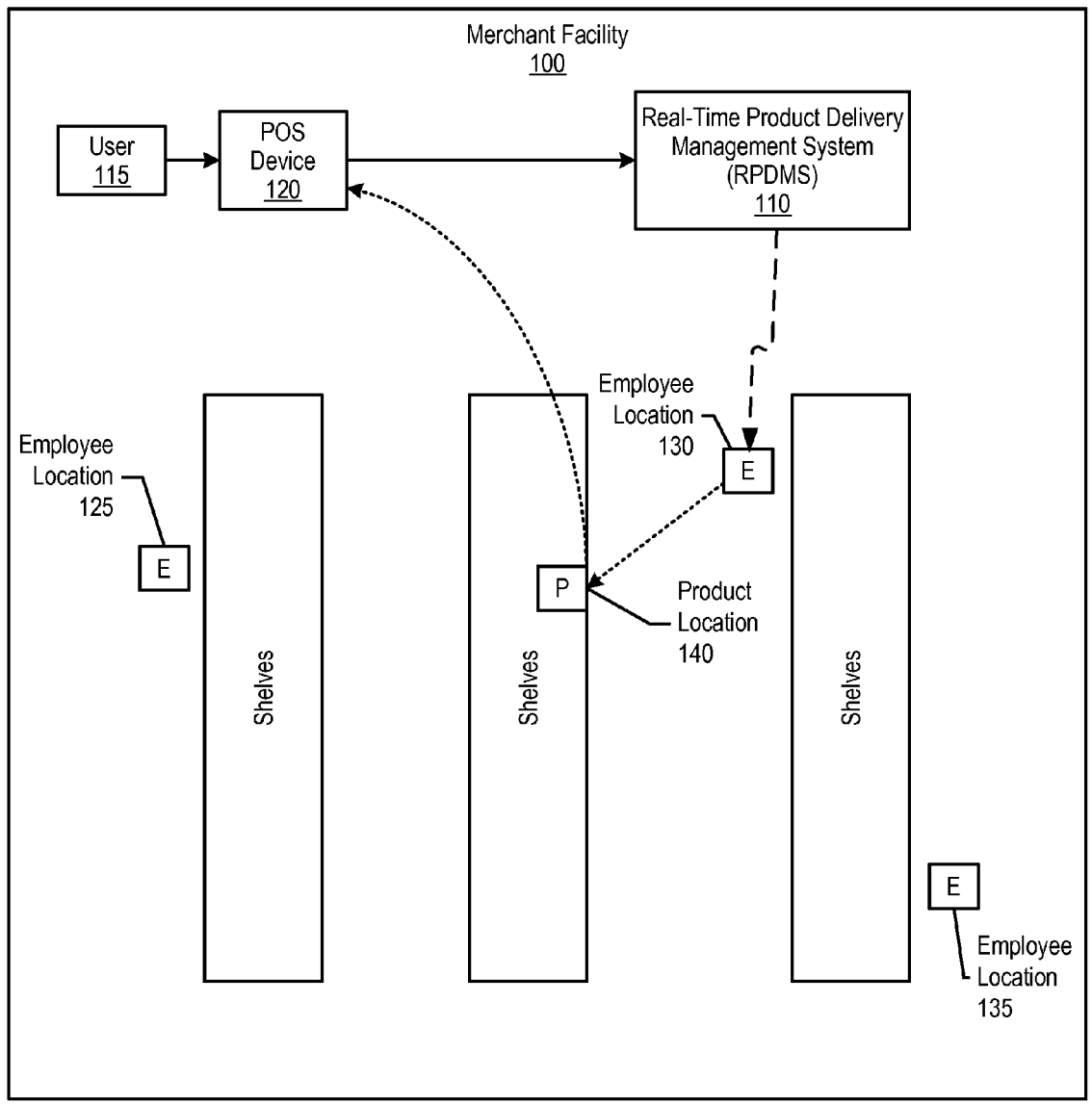
FIG. 1 is a diagram showing a real-time product delivery management system (RPDMS) sending product transport requests to employees to fulfill a product request initiated by a user.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a real-time product delivery management system (RPDMS) sending product transport requests to employees to fulfill a product request initiated by a user. POS Device 120 (e.g., self-service checkout station) and RPDMS 110 provide a point-of-service that allows customers to play an active role in the checkout process. This includes the ability to offer customers the ability to purchase additional products during checkout (e.g., "cross-sell" or "up-sell" opportunities). In one embodiment, the additional products are items that are in some way related to an item purchased, such as batteries for a toy.

FIG. 1 shows merchant facility 100, which may be a location that customers (user 115) purchases products, such as a grocery store, drug store, electronics store, etc. Merchant facility 100 includes real-time product delivery management system 110 and point-of-sale (POS) device 120. POS device 120, in one embodiment, may be a self-checkout station for which user 115 utilizes to purchase products (groceries, electronic merchandise, etc.). As user 115 purchases products, such as by scanning products at POS device 120, POS device 120 (or real-time delivery system 110) identifies additional products that correspond to user 115's purchased products. For example, user 115 may purchase a toy that requires four AAA batteries. In this example, POS device 120 identifies the four AAA batteries as an additional product that user 115 may wish to purchase.

POS device 120 queries user 115 as to whether user 115 wishes to purchase the additional product. If user 115 wishes to purchase the additional product, RPDMS 110 identifies a product location of the product (product location 160), along with employee locations of employees that are working at merchant facility (employee locations 125-135). In one embodiment, in order to identify employee locations 125-135, each employee may possess a mobile device that transmits GPS information to RPDMS 110. In another embodiment, merchant facility 100 may utilizes micro transceivers that identify each employee's location through triangulation techniques (send/receive signals to/from employee mobile devices).

RPDMS 110 determines that employee location 130 is in closest proximity to product location 160 and, in turn, selects the corresponding employee to fulfill the product request. As such, RPDMS 110 sends an electronic message to the selected employee's mobile device that includes a transport request. The transport request includes product request information (product name, SKU number, etc.), along with other information (product location and POS device location), that instructs the selected employee to retrieve the product from product location 160 and transport the product to POS device 120. In turn, user 115 receives the product and purchases the additional product.

In one embodiment, RPDMS 110 may determine that, due to the selected employee's duration at an employee location 130, the selected employee may be busy assisting another customer. In this embodiment, RPDMS 110 may select a different employee to transport the product, such as the employee corresponding to employee location 135.

In another embodiment, in order to ensure that a given collection of additional product purchases does result in a particular employee unnecessarily traveling back and forth from POS 120 to various product locations, RPDMS 110 may group transport requests together and send out a single electronic message, thus effectively utilizes employee resources. In this embodiment, a grouping algorithm may also include a delay to allow for multiple items to be requested simultaneously rather than via separate requests that might possibly end up coming from the same area of the store (see FIGS. 2A, 2B, and corresponding text for further details).

Figure 2A:
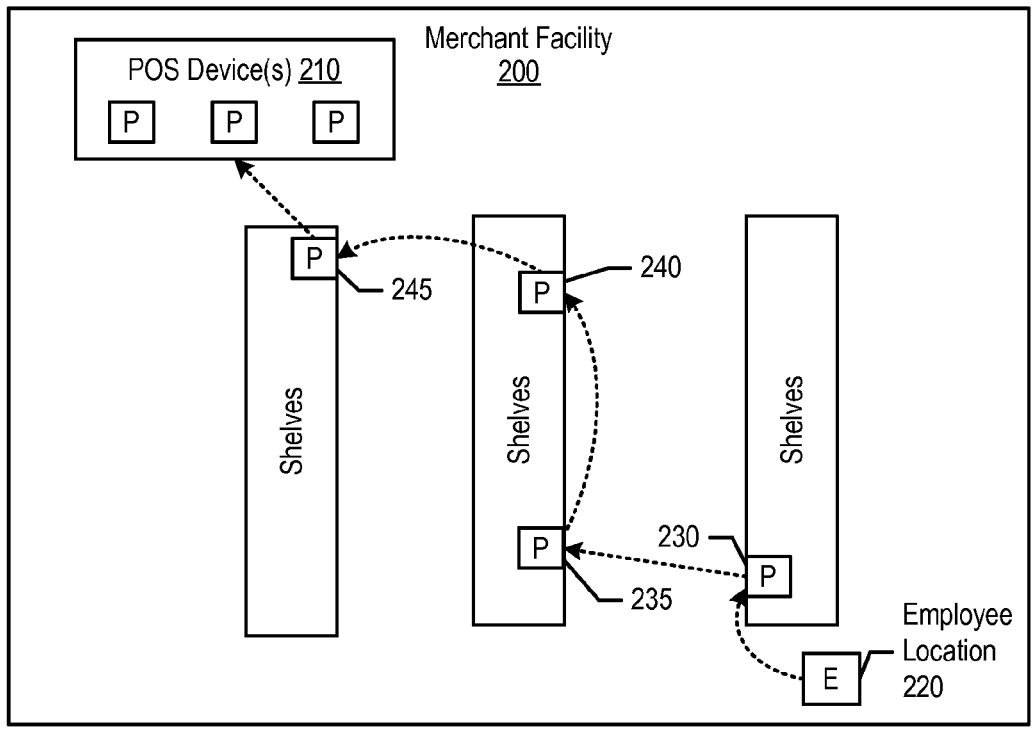
FIG. 2A is a diagram showing an employee transporting multiple products to POS devices based upon the employee's location relative to the POS devices (transport direction)

FIG. 2A is a diagram showing an employee transporting multiple products to POS devices based upon the employee's location relative to the POS devices (transport direction). In one embodiment, a RPDMS (RPDMS 110 shown in FIG. 1) groups product requests based upon a delivery direction from employee location 220 to POS devices 210. The example shown in FIG. 2A shows that after receiving an electronic message that includes multiple transport requests, the employee corresponding to employee location 220 retrieves and transports products 230-245 to POS devices 210. In this embodiment, the electronic message may organize the transport requests according to product locations, thus minimizing backtracking (see FIGS. 3C, 5, and corresponding text for further details). In another embodiment when the RPDMS combines product requests from different POS devices 210, the RPDMS may instruct the employee to transport some products to one POS device, and transport other products to a different POS device.

Figure 2B:
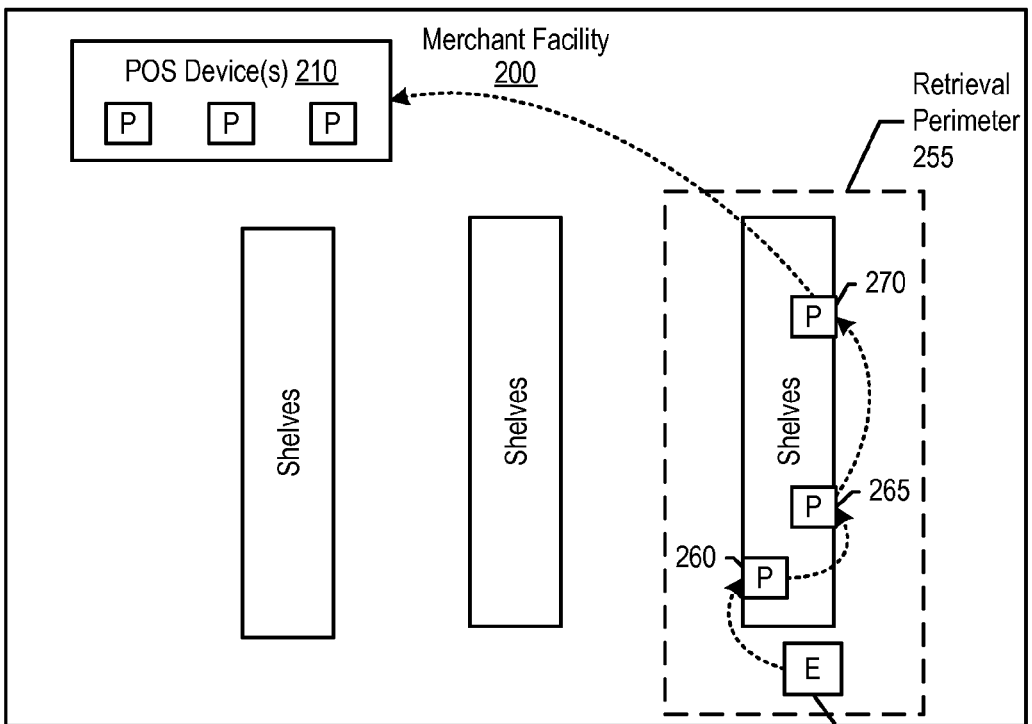
FIG. 2B is a diagram showing an employee transporting multiple products to POS devices based upon a retrieval perimeter that corresponds to the employee's location.

FIG. 2B is a diagram showing an employee transporting multiple products to POS devices based upon a retrieval perimeter that corresponds to the employee's location. In one embodiment, the RPDMS identifies employee location 250 and groups products according to retrieval perimeter 255, which is an area corresponding to employee location 250. The example shown in FIG. 2B shows that the employee corresponding to employee location 250 receives an electronic message to transport products 260-270 to POS devices 210. In one embodiment, the employee is instructed to retrieve products 230-250 in a particular order, thus minimizing backtracking.

Figure 3A:
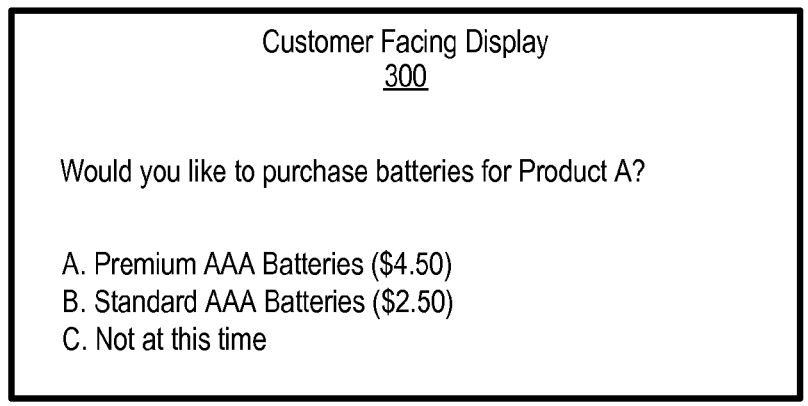
FIG. 3A is a diagram showing a customer facing display that displays an inquiry to a customer (user) regarding an additional product to purchase.

FIG. 3A is a diagram showing a customer facing display that displays an inquiry to a customer (user) regarding an additional product to purchase. A POS device identifies an additional product that a customer may wish to purchase based upon a product the customer purchased (scanned). The POS device queries the customer via customer facing display 300 as to whether the customer wishes to purchase the additional product (e.g., self-checkout screen). FIG. 3A shows that the customer has the option of selecting premium batteries, standard batteries, or choose not to purchase batteries.

Figure 3B:
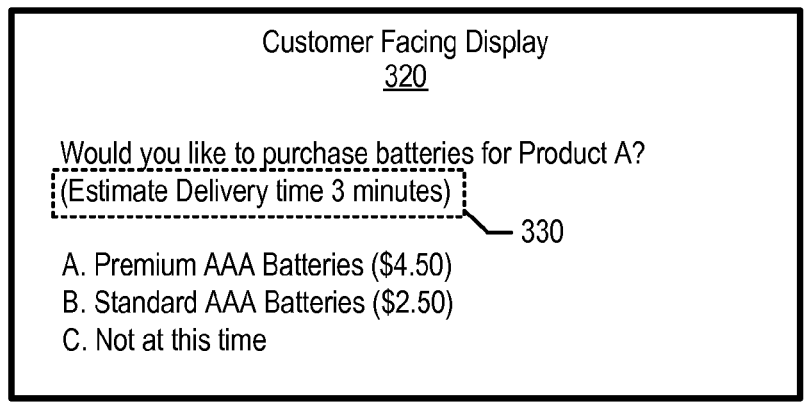
FIG. 3B is a diagram showing a customer facing display that displays an inquiry to a customer (user), along with an estimate delivery time, regarding an additional product to purchase.

FIG. 3B is a diagram showing a customer facing display that displays an inquiry to a customer (user), along with an estimate delivery time, regarding an additional product to purchase. FIG. 3B is similar to FIG. 3A with the exception that FIG. 3B includes estimate delivery time 330. In one embodiment, the POS device (or a real-time delivery management system) computes an estimate delivery time in order for the customer make an informed decision as to whether the customer wishes to purchase the additional product. For example, a customer may be at the beginning stages of purchasing a large amount of products and the estimate delivery time for an additional product is 2 minutes. In this example, the customer may choose to purchase the additional product since the additional product purchase would not delay the customer's overall checkout time.

Figure 3C:
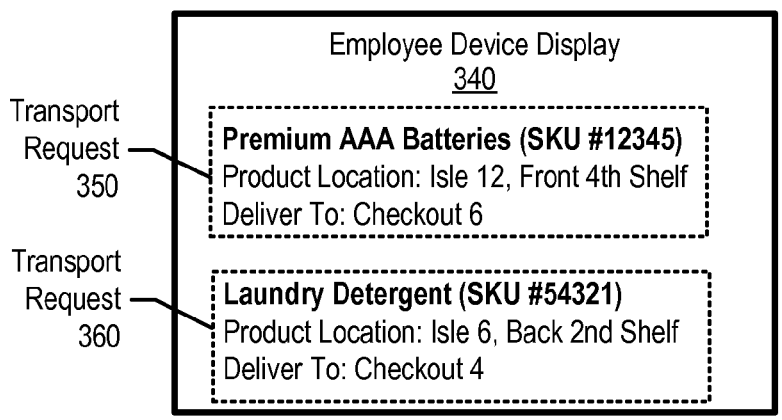
FIG. 3C is a diagram showing an employee's mobile device display that displays transport requests for the employee to fulfill.

FIG. 3C is a diagram showing an employee's mobile device display that displays transport requests for the employee to fulfill. In one embodiment, an employee possesses a mobile device that receives electronic messages for fulfilling one or more transport requests. Employee display device 340 shows transport requests 350 and 360, each corresponding to a particular product request. Each of transport requests 350 and 360 includes a product identifier (product name/SKU number), a product location (Isle, shelf, etc.), and a POS device location (checkout station number). In one embodiment, the electronic message and, in turn, employee display device 340, organizes the transport requests based upon a most efficient retrieval process for the employee, thus minimizing backtracking.

Figure 4:
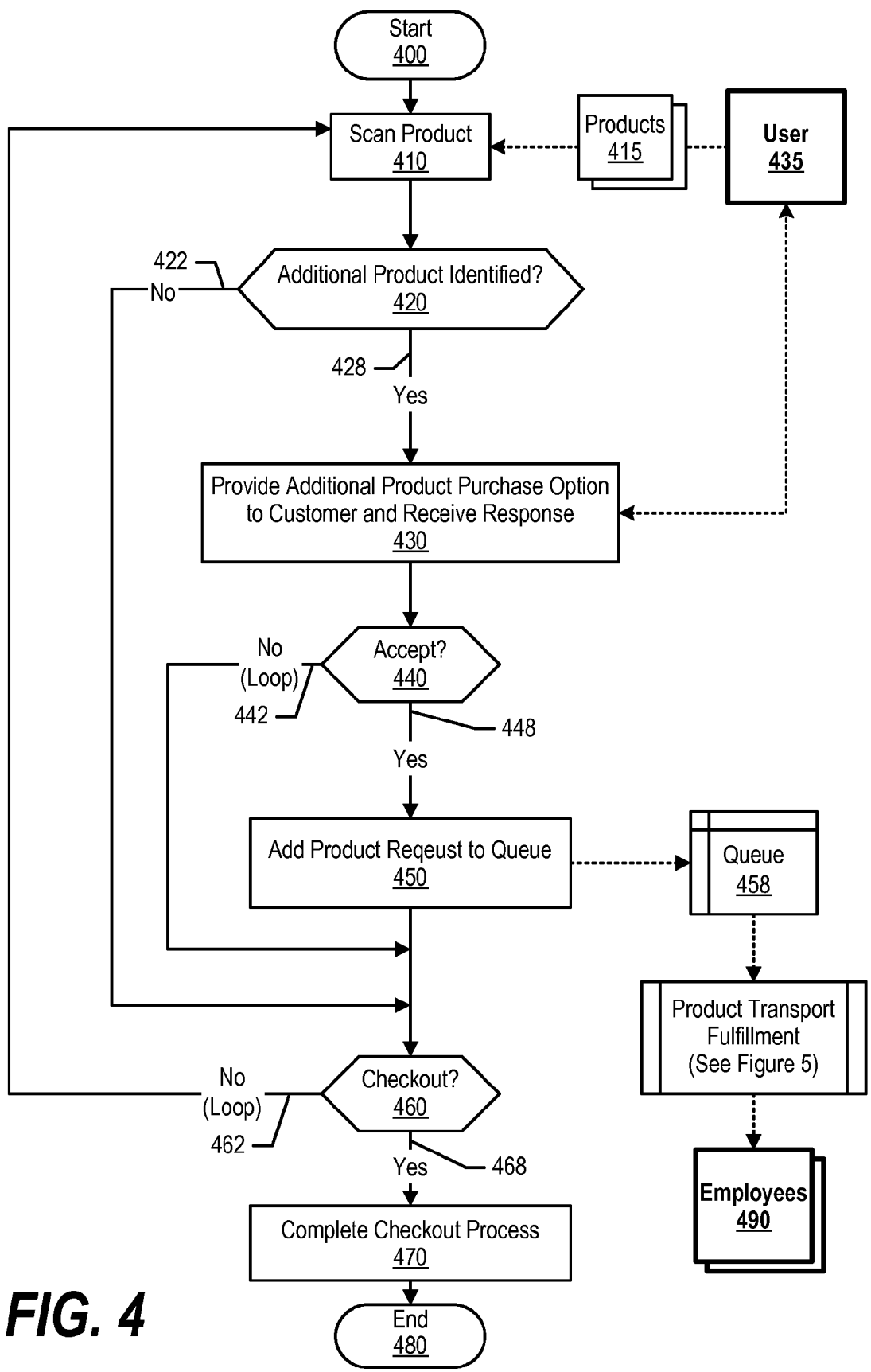
FIG. 4 is a flowchart showing steps taken in identifying an additional sale opportunity and, once confirmed, sending an electronic message to an employee to retrieve the identified product and deliver the product to a point-of-sale device.

FIG. 4 is a flowchart showing steps taken in identifying an additional sale opportunity and, once confirmed, sending an electronic message to an employee to retrieve the identified product and deliver the product to a point-of-sale device. Processing commences at 400, whereupon a point-of-sale (POS) device scans one of products 415 from user 435 at step 410. A determination is made as to whether an additional product corresponds to the scanned product (e.g., cross sale or up sale opportunity) (decision 420). For example, a toy that is scanned may require four AAA batteries and, in this example, the POS device identifies the four AAA batteries as an additional product that the customer may wish to purchase. In one embodiment, the POS device (or RPDMS) may access a database that cross-references products to identify additional sale opportunities.

If an additional product is not identified, decision 420 branches to "No" branch 422, which bypasses additional product purchasing/transporting steps. On the other hand, if an additional product is identified, decision 420 branches to "Yes" branch 428, whereupon the POS device provides an additional product option to user 435, which informs user 435 that the recently scanned item has a corresponding additional product that the customer may be interested in purchasing. In one embodiment, processing computes an estimate delivery time that the product will be delivered to the POS device. In this embodiment, user 435 makes an informed decision as to whether to purchase the additional product.

A determination is made as to whether user 435 wishes to purchase the additional product (decision 440). If user 435 does not wish to purchase the additional product, decision 440 branches to "No" branch 442, bypassing steps to add a product request to a transport queue. On the other hand, if user 435 wishes to purchase the additional product, decision 440 branches to "Yes" branch 448, whereupon processing adds a product request to queue 458 at step 450. In one embodiment, the product request includes one or more product identifiers such as a name and/or a SKU number. In another embodiment, the product is automatically charged to user 435's user in so user 435 does not have to wait until the product arrives before checking out.

In one embodiment, the product request may be immediately processed, which includes sending an electronic message to one of employees 490 to retrieve and transport the corresponding product. In another embodiment, product requests may be grouped according to a particular transport grouping option in order to increase employee efficiency (see FIG. 5 and corresponding text for further details)

At step 455, processing adds a product retrieval entry to queue 458 that includes a product identifier (e.g., name, sku number, etc.), a product location, an employee identifier, and an employee location. In turn, the POS device, or a product delivery management system, sends an electronic message to the identified employee to transport the product to the POS device (see FIG. 6 and corresponding text for further details). In one embodiment, processing tracks product transport times in order to analyze employee performance and/or grouping parameters (see FIG. 7 and corresponding text for further details). Queue 458 may be stored on a volatile or nonvolatile storage area, such as computer memory or a computer hard drive.

A determination is made as to whether user 435 has finished scanning products and is ready to checkout (decision 460). If user 435 has more products to purchase, decision 460 branches to "Yes" branch 462, which loops back to scan another product. This looping continues until user 435 wishes to checkout, at which point decision 460 branches to "No" branch 468. At step 470, processing completes the checkout processes (accepting credit card information, printing receipt, etc.) and ends at 480.

In one embodiment, such as at a large merchant facility with multiple POS devices (e.g., checkout stations), steps shown in FIG. 4 may be performed by a combination of the POS devices and the RPDMS. In another embodiment, such as at a small drug store, steps shown in FIG. 4 may be performed by the POS device.

Figure 5:
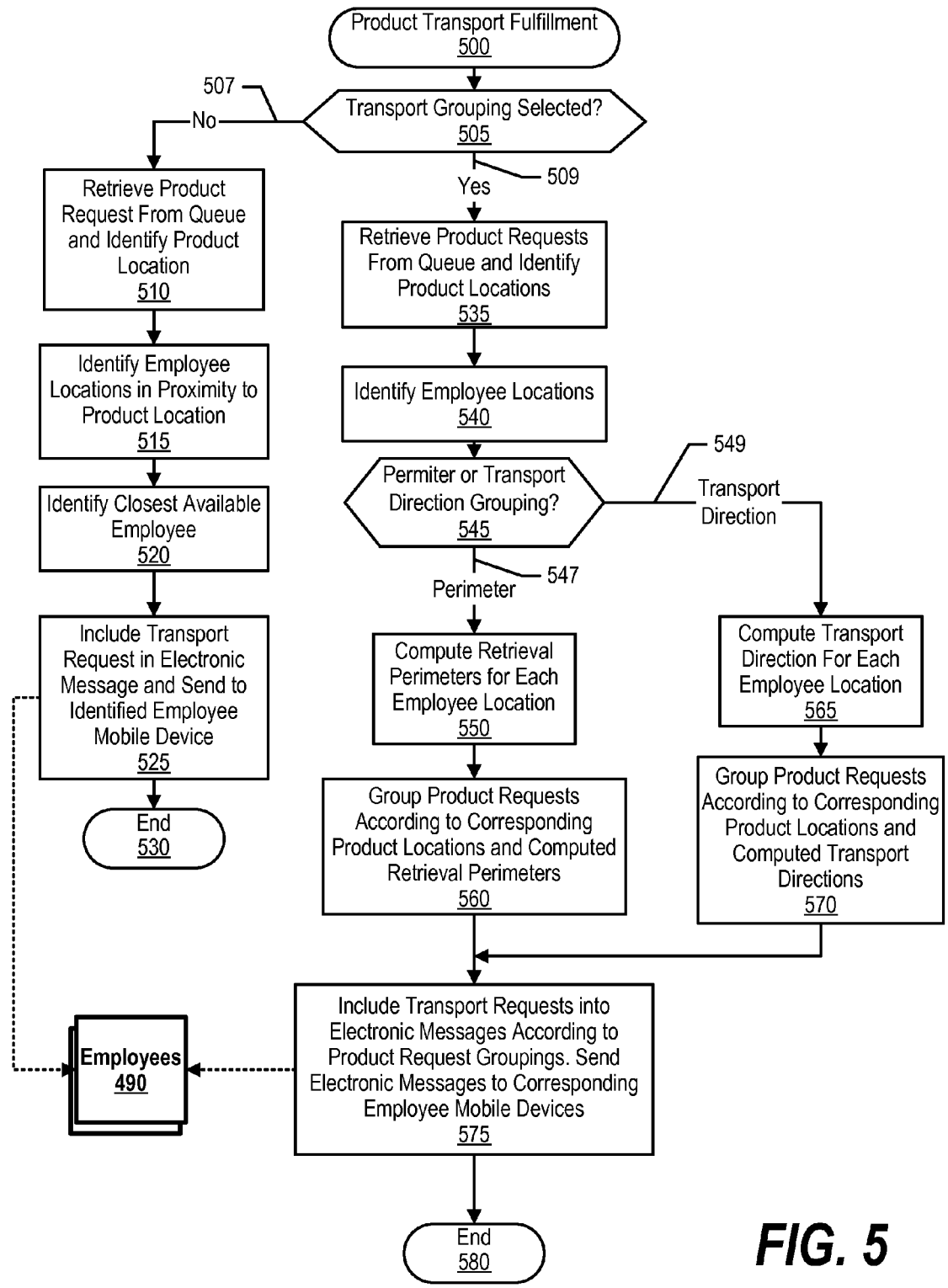
FIG. 5 is a flowchart showing steps taken in including transport requests into electronic messages and sending the electronic messages to employees to transport the additional product to one or more POS devices.

FIG. 5 is a flowchart showing steps taken in including transport requests into electronic messages and sending the electronic messages to employees to transport the additional product to one or more POS devices. Product transport fulfillment commences at 500, whereupon a determination is made as to whether a transport grouping is selected to group product requests into an electronic message (decision 505). If a transport grouping option is not selected, decision 505 branches to "No" branch 505, whereupon processing retrieves a product request from a queue (queue 458 in FIG. 4) and identifies a product location of the corresponding product (step 510). In one embodiment, an RPDMS may utilize a lookup table that maps product identifiers (e.g., SKU number, product name, etc.) to geographic coordinates (GPS location, etc.).

At step 515, processing identifies employee locations in proximity to the product location and, at step 520, processing identifies a closest available employee. Processing may identify the closest available employee, for example, based upon the amount of stationary time that the employee is at a single location, or an "unavailable" signal transmitted from the employee's mobile device that was activated by the employee.

Processing includes a transport request corresponding to the product and the identified employee in an electronic message, and transmits the electronic message to one of employees 490 (step 530). Processing ends at 530. As those skilled in the art can appreciate, processing may repeat steps 510-525 as long as product requests exist in the queue.

Referring back to decision 505, if a transport grouping option is selected, decision 505 branches to "Yes" branch 509, whereupon processing retrieves product requests from the queue, and identifies product locations for each of the corresponding products. At step 540, processing identifies employee locations of the employees within a merchant facility. In one embodiment, processing identifies employee locations of employees that are available to transport products.

A determination is made as to whether a retrieval perimeter grouping option or a transport direction grouping option is configured (decision 545). For example, a merchant may configure an RPDMS to group transport requests according to a retrieval perimeter for certain areas of the merchant facility (e.g., frozen food section), and configure the RPDMS to group transport requests according to a transport direction for other areas of the merchant facility (see FIGS. 2A, 2B, and corresponding text for further details).

If the retrieval perimeter grouping option is configured, decision 545 branches to "Perimeter" branch 547, whereupon processing computes retrieval perimeters corresponding to each employee location at step 550 (e.g., by isles). At step 560, processing groups product requests according to product locations and retrieval perimeters, such as products A, B, C in isle 4 are grouped with an employee whose retrieval perimeter includes isle 4.

Processing generates transport requests (includes product identifier, product location, etc.) into electronic messages according to the groupings from step 560, and sends the electronic messages to employees 490 to retrieve and transport the additional products corresponding to the product requests to various POS devices (step 475). In one embodiment, the transport requests are organized in a manner to minimize employee backtracking as discussed herein.

On the other hand, if the transport direction grouping option is configured, decision 545 branches to "Transport Direction" branch 549, whereupon processing computes transport directions corresponding to each employee location relative to POS device locations at step 550. At step 560, processing groups product requests according to product locations and transport directions. For example, an employee's transport direction may be across the front of the store and, in this example, processing groups products with the transport direction whose product locations are at the front of the store.

Processing generates transport requests (includes product identifier, product location, etc.) into electronic messages according to the groupings from step 570, and sends the electronic messages to employees 490 to retrieve and transport the additional products corresponding to the product requests to various POS devices (step 575). Processing ends at 580.

Figure 6:
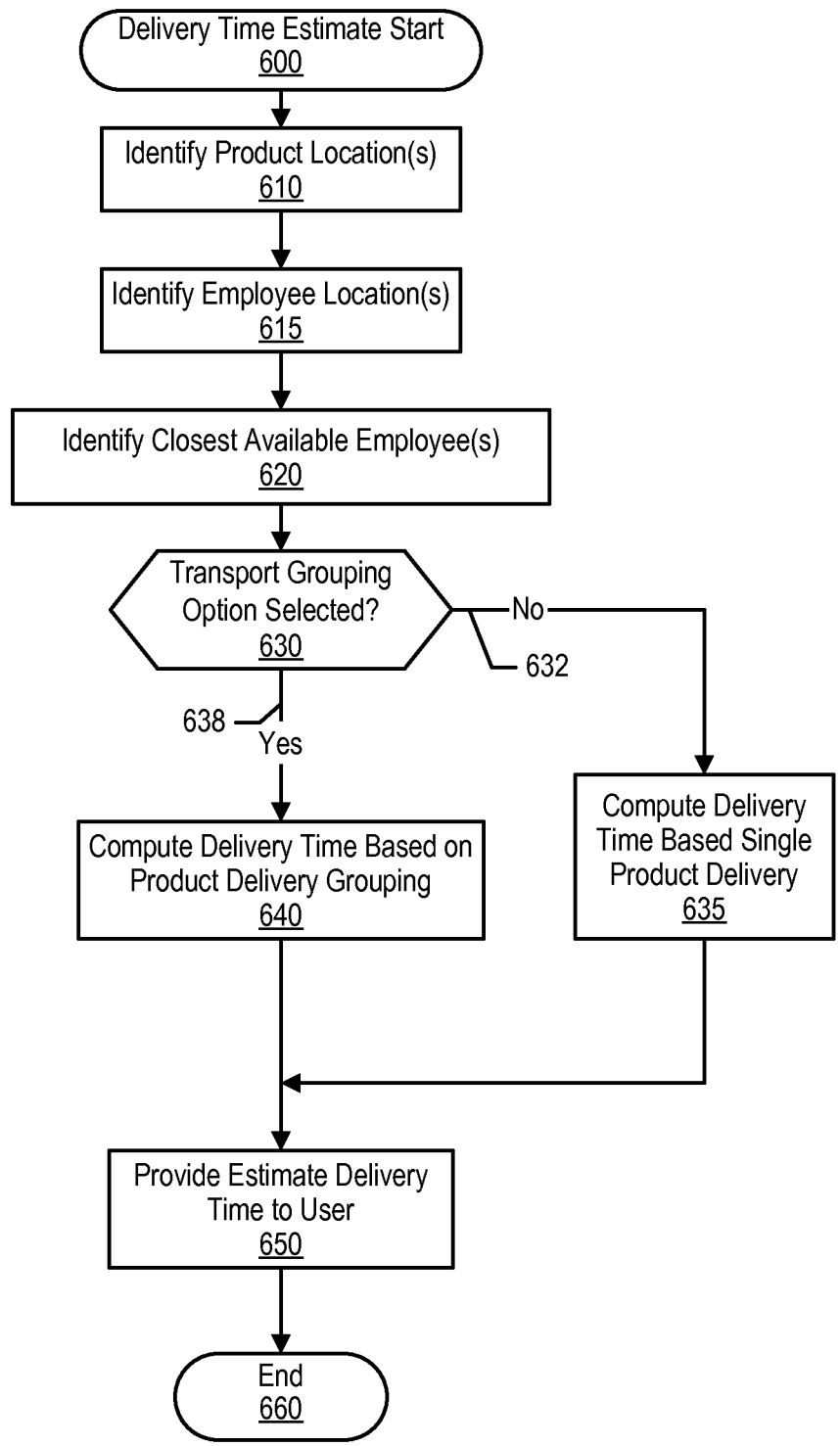
FIG. 6 is a flowchart showing steps taken in estimating a delivery time for an employee to transport a product from a corresponding product location to a POS device.

FIG. 6 is a flowchart showing steps taken in estimating a delivery time for an employee to transport a product from a corresponding product location to a POS device. Processing commences at 600, whereupon processing identifies a product location at step 610 corresponding to an additional product that a customer wishes to purchase (e.g., isle 4, $4^{th}$ shelf, mid-section). At step 615, processing identifies employee locations within the merchant facility. For example, each employee may have a mobile device that transmits GPS information to a product delivery management system. In another example, the merchant facility may have micro transceivers that identify each employee's location through triangulation (send/receive signals to/from employee mobile devices).

Processing, at step 620, identifies the closest available employee based upon the employee locations and the product location. In one embodiment, processing identifies which employees are available based upon the amount of stationary time that the employee is at a single location, or an "unavailable" signal transmitted from the employee's mobile device as discussed herein.

A determination is made as to whether a grouping selection is enabled to group product transport requests into a single electronic message (decision 630). In one embodiment, a merchant may wish to send an electronic message to an employee to transport five products to different POS devices instead of sending five different messages to five different employees. In this embodiment, the merchant may select a particular grouping option, which instructions the POS device (or RPDMS) to group product transport requests (see FIGS. 2A, 2B, and corresponding text for further details).

If grouping selection is enabled, decision 630 branches to "Yes" branch 638, whereupon processing computes an estimate delivery time based upon the identified employee and the products that the employee is currently scheduled to transport (decision 640). On the other hand, if the grouping selection is not enabled, decision 640 branches to "No" branch 632, whereupon processing computes an estimate delivery time based upon the employee location, the product location, and the POS device location (step 635).

At step 650, processing provides the estimate delivery time to the customer, which assists the customer in deciding whether to purchase the additional product (see FIG. 3B and corresponding text for further details). Processing ends at 660.

Figure 7:
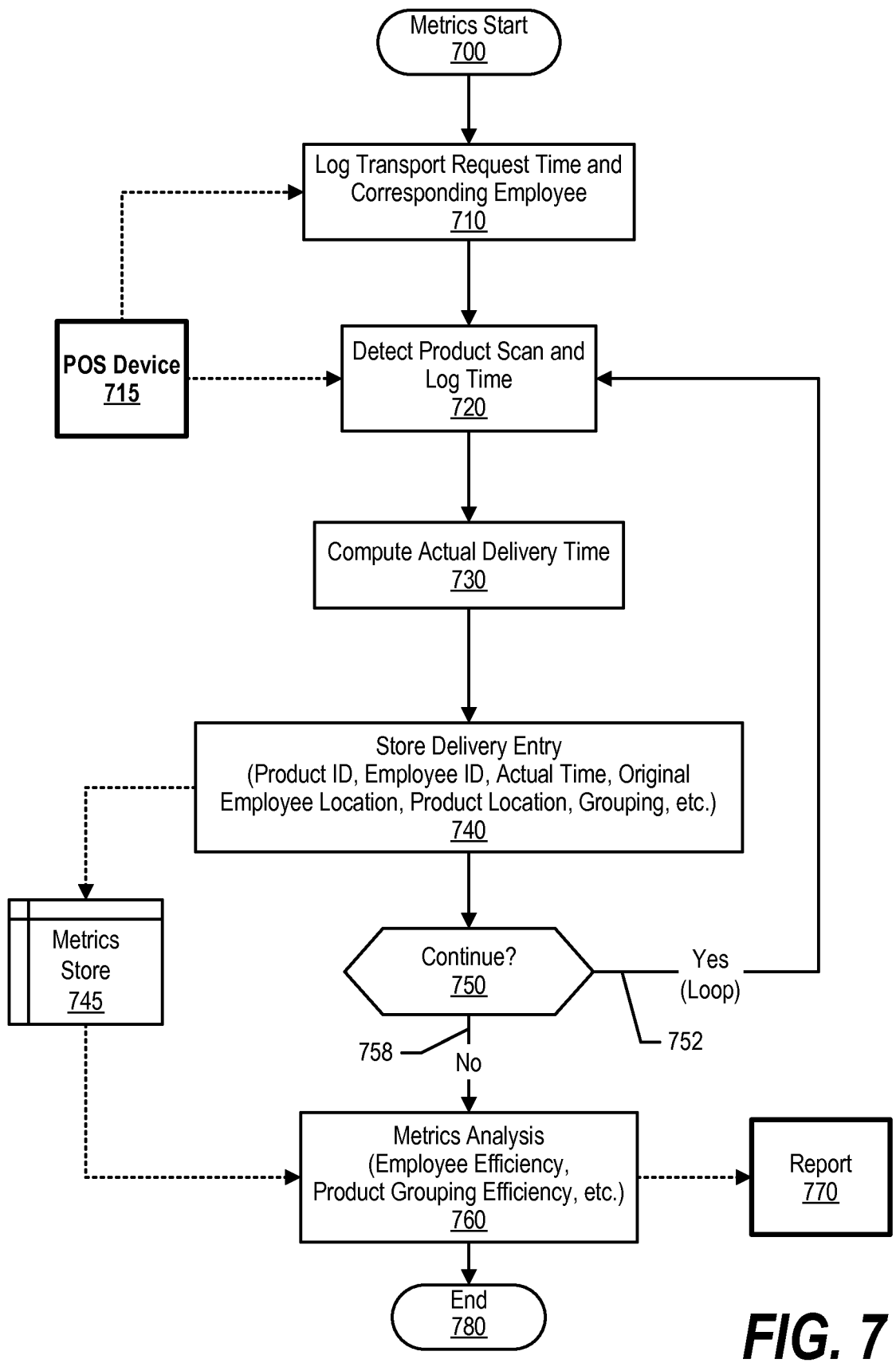
FIG. 7 is a flowchart showing steps taken in generating and analyzing product transport metrics.

FIG. 7 is a flowchart showing steps taken in generating and analyzing product transport metrics. The product transport metrics may, in one embodiment, enables a merchant to track employee efficiency and/or monitor the effectiveness of the merchant's product transport grouping techniques.

Processing commences at 700, whereupon processing logs an additional product's request time (e.g., from POS device 715), transport request time (e.g., from RPDMS 110), and an employee that is identified to transport the product. At step 720, processing detects that the additional product is scanned at POS device 715 and, at step 730, processing computes an actual delivery time. In one embodiment, processing computes the actual delivery time based upon the transport request time and the scanned time, which indicates the amount of time that the employee took to transport the product once the electronic message was sent to the employee. In another embodiment, processing computes the actual delivery time based upon the product request time and the scanned time, which indicates the amount of time that a customer (user) waited to scan the additional product once the customer requested the additional product.

At step 740, processing stores a delivery entry in metrics store 745, which may include information such as a product identifier, an employee identifier, one or more computed actual delivery times (as discussed above), an employee location, a product location, and whether a transport grouping option was enabled for the transport request.

A determination is made as to whether to continue tracking additional product transport times (decision 750). If processing should continue tracking additional product transport times, decision 750 branches to "Yes" branch 752, which loops back to continue logging additional product information. This looping continues until processing should terminate, or the merchant wishes to analyze metric information, at which point decision 750 branches to "No" branch 758. At step 760, processing retrieves delivery entries from metrics store 745 and, in one embodiment, generates report 770. Report 770, for example, may include transport times sorted by employees, transport grouping options, product locations, etc. Processing ends at 780.

Figure 8:
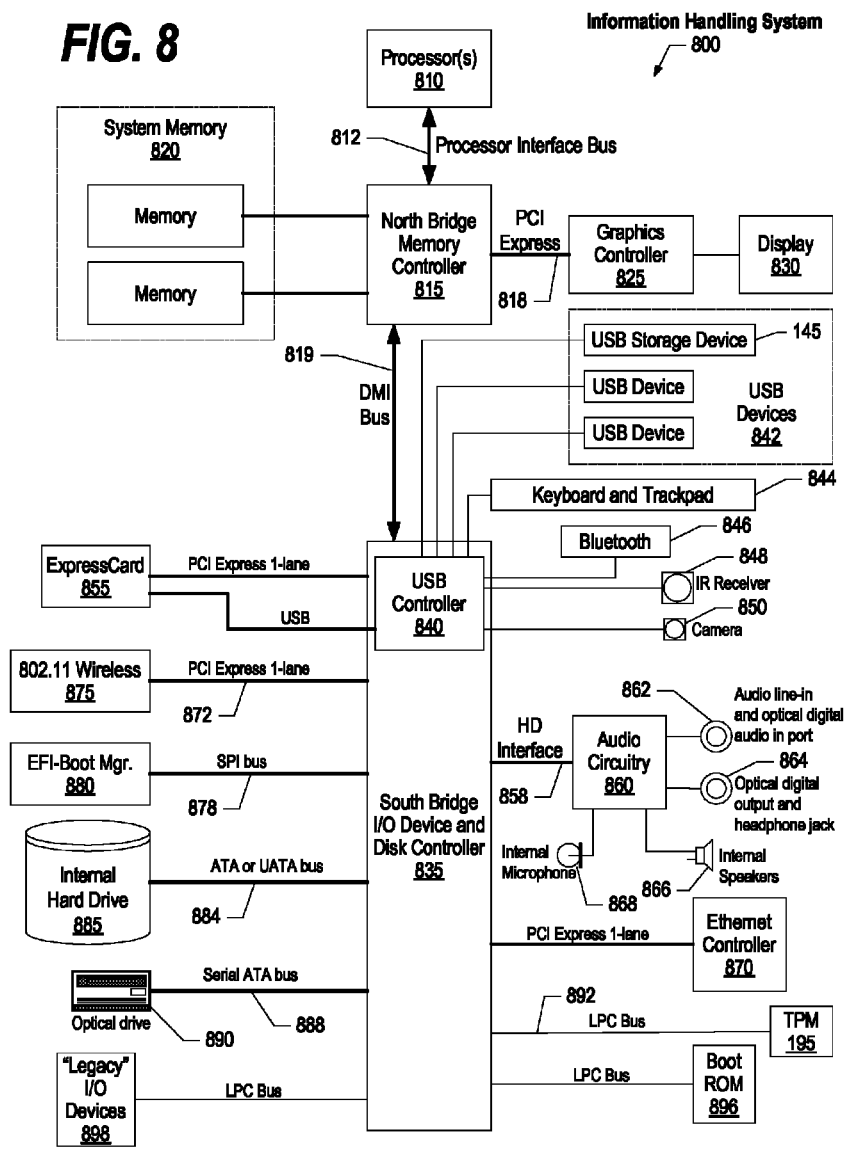
FIG. 8 is a block diagram of a data processing system in which the methods described herein can be implemented.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 895) shown in FIG. 8 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 9.

Figure 9:
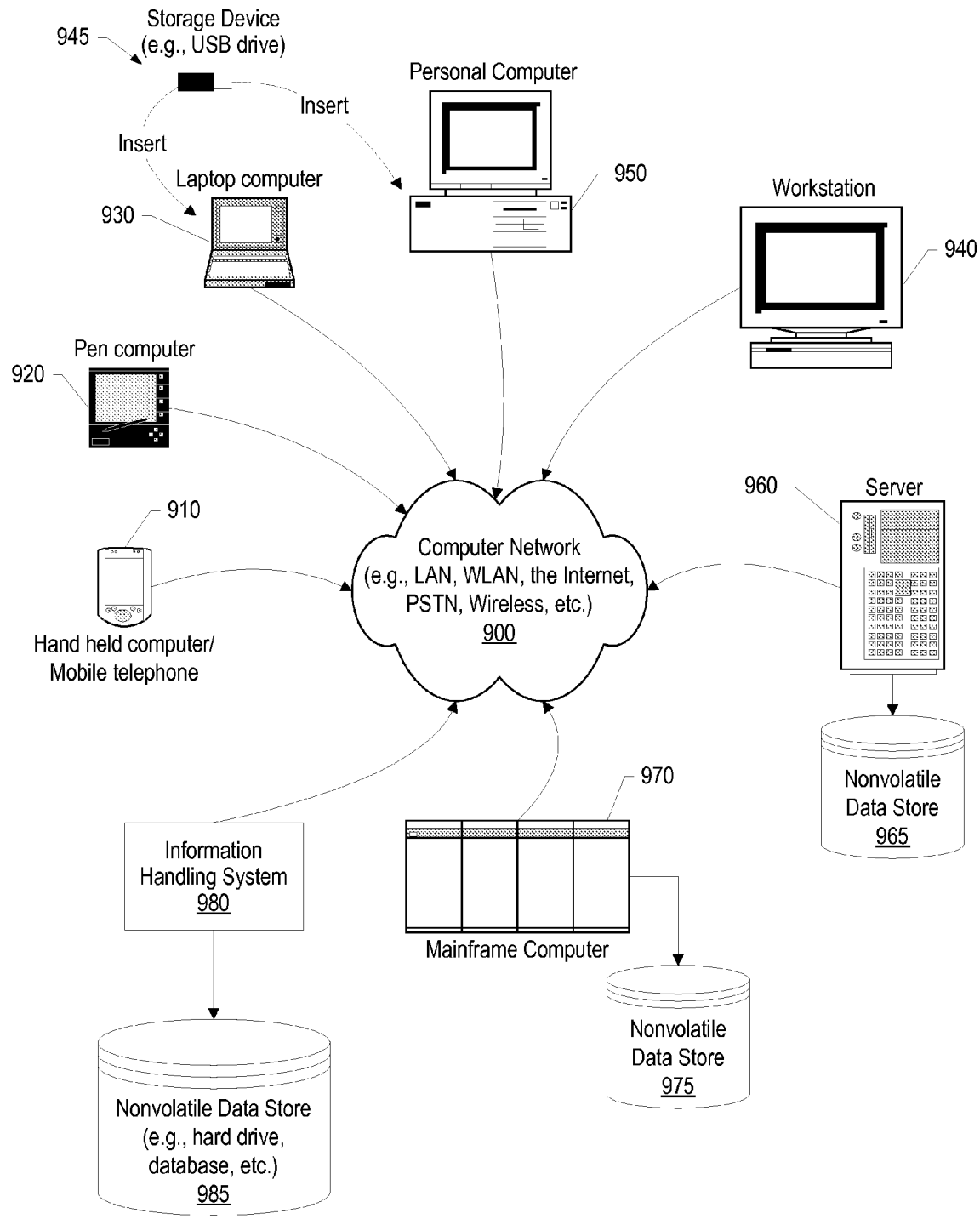
FIG. 9 provides an extension of the information handling system environment shown in FIG. 8 to illustrate that the methods described herein can be performed on a wide variety of information handling systems which operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   identifying an initial product at a point-of-sale (POS) device located at a merchant facility, the POS device being a checkout counter;
   determining that an associated product corresponds to the initial product;
   identifying an employee location, from a plurality of employee locations, that is in proximity to a location of the associated product, the employee location corresponding to an employee;
   computing an estimated transport time for the employee to get to the associated product and transport the associated product from the location of the associated product to the POS device;
   providing a prompt at the POS device to a user purchasing the initial product to indicate whether the user also wants to purchase the associated product, wherein the prompt includes the estimated transport time;
   generating a product request corresponding to the associated product in response to receiving the indication that the user wants to purchase the associated product; and
   sending an electronic message to a mobile device that corresponds to the employee, wherein the electronic message includes a request to transport the associated product from the location of the associated product to the POS device.

2. The method of claim 1 further comprising:
   generating a different product request corresponding to a different product that is located at a different product location within the merchant facility in response to receiving a different indication that the user wants to purchase the different product;
   determining that a transport grouping option is selected; and
   in response to determining that the transport grouping option is selected, including a different request in the electronic message to transport the different product from the different product location to the POS device.

3. The method of claim 2 further comprising:
   in response to identifying that the transport grouping option is based upon a retrieval perimeter:
      computing the retrieval perimeter based upon the employee location; and
      determining that the different product location resides within the retrieval perimeter; and in response to identifying that the transport grouping option is based upon a transport direction:
  computing the transport direction based upon the employee location and a point-of sale device location that corresponds to the point-of-sale device; and
  identifying that the different product location is in proximity to the transport direction.

4. The method of claim 1 further comprising:
in response to receiving the indication that the user wants to purchase the associated product, automatically charging the associated product to a user bill prior to receiving the associated product at the POS device.

5. The method of claim 1 further comprising:
identifying an initial employee location, from the plurality of employee locations, that is closer in proximity to the location of the associated product than the employee location;
identifying an amount of stationary time that an initial employee is located at the initial employee location;
in response to determining the amount of stationary time, determining that the initial employee is unavailable to transport the associated product from the location of the associated product to the point-of-sale device;
in response to determining that the initial employee is unavailable, determining that the employee is available to transport the associated product from the location of the associated product to the point-of-sale device; and
in response to determining that the employee is available, sending the electronic message to the mobile device corresponding to the employee.

6. The method of claim 1, further comprising:
identifying a second initial product at a second point-of-sale (POS) device located at a the merchant facility, the second POS device being a checkout counter;
determining that a second associated product corresponds to the second initial product and computing an estimated transport time for the employee to get to the associated product and transport the second associated product from a location of the second associated product to the POS device;
providing at the second POS device a prompt to a second user purchasing the second initial product to indicate whether the second user also wants to purchase the second associated product, wherein the prompt includes the estimated transport time;
generating a second product request corresponding to the second associated product in response to receiving the indication that the second user wants to purchase the second associated product; and
upon determining that the employee is in proximity to the location of the second associated product, sending an electronic message to the mobile device that corresponds to the employee, wherein the electronic message includes a request to transport the second associated product from the location of the second associated product to the second POS device, and wherein the request further instructs the employee to retrieve the associated product from the location of the associated product and the second associated product from the location of the second associated product before delivering the associated product to the POS device and delivering the second associated product to the second POS device.

7. An information handling system comprising:
one or more processors;
a memory coupled to at least one of the processors;
a set of computer program instructions stored in the memory and executed by at least one of the processors in order to perform actions of:
  identifying an initial product at a point-of-sale (POS) device located at a merchant facility, the POS device being a checkout counter;
  determining that an associated product corresponds to the initial product;
  identifying an employee location, from a plurality of employee locations, that is in proximity to a location of the associated product, the employee location corresponding to an employee;
  computing an estimated transport time for the employee to get to the associated product and transport the associated product from the location of the associated product to the POS device;
  providing a prompt at the POS device to a user purchasing the initial product to indicate whether the user also wants to purchase the associated product, wherein the prompt includes the estimated transport time;
  generating a product request corresponding to the associated product in response to receiving the indication that the user wants to purchase the associated product; and
  sending an electronic message to a mobile device that corresponds to the employee, wherein the electronic message includes a request to transport the associated product from the location of the associated product to the POS device.

8. The information handling system of claim 7 wherein the processors perform additional actions comprising:
generating a different product request corresponding to a different product that is located at a different product location within the merchant facility in response to receiving a different indication that the user wants to purchase the different product;
determining that a transport grouping option is selected; and
in response to determining that the transport grouping option is selected, including a different request in the electronic message to transport the different product from the different product location to the POS device.

9. The information handling system of claim 8 wherein the processors perform additional actions comprising:
in response to identifying that the transport grouping option is based upon a retrieval perimeter:
  computing the retrieval perimeter based upon the employee location; and
  determining that the different product location resides within the retrieval perimeter; and
in response to identifying that the transport grouping option is based upon a transport direction:
  computing the transport direction based upon the employee location and a point-of sale device location that corresponds to the point-of-sale device; and
  identifying that the different product location is in proximity to the transport direction.

10. The information handling system of claim 7 wherein the processors perform additional actions comprising:
in response to receiving the indication that the user wants to purchase the associated product, automatically charging the associated product to a user bill prior to receiving the associated product at the POS device.

11. The information handling system of claim 7 wherein the processors perform additional actions comprising:
  identifying an initial employee location, from the plurality of employee locations, that is closer in proximity to the location of the associated product than the employee location;
  identifying an amount of stationary time that an initial employee is located at the initial employee location;
  in response to determining the amount of stationary time, determining that the initial employee is unavailable to transport the associated product from the location of the associated product to the point-of-sale device;
  in response to determining that the initial employee is unavailable, determining that the employee is available to transport the associated product from the location of the associated product to the point-of-sale device; and
  in response to determining that the employee is available, sending the electronic message to the mobile device corresponding to the employee.

12. The information handling system of claim 7, further comprising a set of computer program instructions stored in the memory and executed by at least one of the processors in order to perform actions of:
  identifying a second initial product at a second point-of-sale (POS) device located at a the merchant facility, the second POS device being a checkout counter;
  determining that a second associated product corresponds to the second initial product and computing an estimated transport time for the employee to get to the associated product and transport the second associated product from a location of the second associated product to the POS device;
  providing at the second POS device a prompt to a second user purchasing the second initial product to indicate whether the second user also wants to purchase the second associated product, wherein the prompt includes the estimated transport time;
  generating a second product request corresponding to the second associated product in response to receiving the indication that the second user wants to purchase the second associated product; and
  upon determining that the employee is in proximity to the location of the second associated product, sending an electronic message to the mobile device that corresponds to the employee, wherein the electronic message includes a request to transport the second associated product from the location of the second associated product to the second POS device, and wherein the request further instructs the employee to retrieve the associated product from the location of the associated product and the second associated product from the location of the second associated product before delivering the associated product to the POS device and delivering the second associated product to the second POS device.

13. A computer program product stored in a non-transitory computer readable storage medium, comprising computer program code that, when executed by an information handling system, causes the information handling system to perform actions comprising:
  identifying an initial product at a point-of-sale (POS) device located at a merchant facility, the POS device being a checkout counter;
  determining that an associated product corresponds to the initial product;
  identifying an employee location, from a plurality of employee locations, that is in proximity to a location of the associated product, the employee location corresponding to an employee;
  computing an estimated transport time for the employee to get to the associated product and transport the associated product from the location of the associated product to the POS device;
  prompting at the POS device a user purchasing the initial product to indicate whether the user also wants to purchase the associated product, wherein the prompt includes the estimated transport time;
  generating a product request corresponding to the associated product in response to receiving the indication that the user wants to purchase the associated product; and
  sending an electronic message to a mobile device that corresponds to the employee, wherein the electronic message includes a request to transport the associated product from the location of the associated product to the POS device.

14. The computer program product of claim 13 wherein the information handling system performs further actions comprising:
  generating a different product request corresponding to a different product that is located at a different product location within the merchant facility in response to receiving a different indication that the user wants to purchase the different product;
  determining that a transport grouping option is selected; and
  in response to determining that the transport grouping option is selected, including a different request in the electronic message to transport the different product from the different product location to the POS device.

15. The computer program product of claim 14 wherein the information handling system performs further actions comprising:
  in response to identifying that the transport grouping option is based upon a retrieval perimeter:
    computing the retrieval perimeter based upon the employee location; and
    determining that the different product location resides within the retrieval perimeter; and
  in response to identifying that the transport grouping option is based upon a transport direction:
    computing the transport direction based upon the employee location and a point-of sale device location that corresponds to the point-of-sale device; and
    identifying that the different product location is in proximity to the transport direction.

16. The computer program product of claim 13 wherein the information handling system performs further actions comprising:
  identifying an initial employee location, from the plurality of employee locations, that is closer in proximity to the location of the associated product than the employee location;
  identifying an amount of stationary time that an initial employee is located at the initial employee location;
  in response to determining the amount of stationary time, determining that the initial employee is unavailable to transport the associated product from the location of the associated product to the point-of-sale device;
  in response to determining that the initial employee is unavailable, determining that the employee is available to transport the associated product from the location of the associated product to the point-of-sale device; and in response to determining that the employee is available, sending the electronic message to the mobile device corresponding to the employee.

17. The computer program product of claim 13, wherein the information handling system performs further actions comprising:

identifying a second initial product at a second point-of-sale (POS) device located at the merchant facility, the second POS device being a checkout counter;

determining that a second associated product corresponds to the second initial product and computing an estimated transport time for the employee to get to the associated product and transport the second associated product from a location of the second associated product to the POS device;

providing at the second POS device a prompt to a second user purchasing the second initial product to indicate whether the second user also wants to purchase the second associated product, wherein the prompt includes the estimated transport time;

generating a second product request corresponding to the second associated product in response to receiving the indication that the second user wants to purchase the second associated product; and upon determining that the employee is in proximity to the location of the second associated product, sending an electronic message to the mobile device that corresponds to the employee, wherein the electronic message includes a request to transport the second associated product from the location of the second associated product to the second POS device, and wherein the request further instructs the employee to retrieve the associated product from the location of the associated product and the second associated product from the location of the second associated product before delivering the associated product to the POS device and delivering the second associated product to the second POS device.

* * * * *

UNITED STATES PATENT AND TRADEMARK OFFICE
CERTIFICATE OF CORRECTION

| | |
|---|---|
| PATENT NO. | : 8,719,098 B2 |
| APPLICATION NO. | : 13/107870 |
| DATED | : May 6, 2014 |
| INVENTOR(S) | : Burkhart et al. |

Page 1 of 1

It is certified that error appears in the above-identified patent and that said Letters Patent is hereby corrected as shown below:

In the Claims:

Column 13, Claim 6, Line 34, please delete "a";

Column 15, Claim 12, Line 26, please delete "a".

Signed and Sealed this
Twenty-sixth Day of August, 2014

Michelle K. Lee
*Deputy Director of the United States Patent and Trademark Office*